United States Patent
Coggeshall

(10) Patent No.: US 6,961,336 B2
(45) Date of Patent: Nov. 1, 2005

(54) CONTACTING A COMPUTING DEVICE OUTSIDE A LOCAL NETWORK

(75) Inventor: Robert Coggeshall, Mercer Island, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 565 days.

(21) Appl. No.: 09/800,755

(22) Filed: Mar. 6, 2001

(65) Prior Publication Data

US 2003/0198219 A1 Oct. 23, 2003

(51) Int. Cl.[7] .............................. H04L 12/26; H04J 1/16; G08C 15/00; G06F 11/00; G06F 15/177
(52) U.S. Cl. ....................... 370/389; 370/218; 370/401; 709/220
(58) Field of Search ................................ 370/218–257, 370/352–395, 401–475, 479; 709/220–250

(56) References Cited

U.S. PATENT DOCUMENTS

| | | | |
|---|---|---|---|
| 5,166,931 A | | 11/1992 | Riddle |
| 5,517,488 A | * | 5/1996 | Miyazaki et al. ........... 370/225 |
| 5,623,605 A | | 4/1997 | Keshav et al. |
| 5,708,654 A | * | 1/1998 | Arndt et al. ................ 370/242 |
| 5,781,552 A | * | 7/1998 | Hashimoto .................. 370/447 |
| 5,802,285 A | * | 9/1998 | Hirviniemi .................. 709/250 |
| 5,856,974 A | | 1/1999 | Gervais et al. |
| 6,032,193 A | | 2/2000 | Sullivan |
| 6,038,233 A | | 3/2000 | Hamamoto et al. |
| 6,052,367 A | | 4/2000 | Bowater et al. |
| 6,094,525 A | | 7/2000 | Perlman et al. |
| 6,101,189 A | * | 8/2000 | Tsuruoka ..................... 370/401 |
| 6,115,545 A | * | 9/2000 | Mellquist .................... 709/220 |
| 6,118,784 A | | 9/2000 | Tsuchiya et al. |
| 6,330,616 B1 | * | 12/2001 | Gioquindo et al. ......... 709/236 |
| 6,345,294 B1 | * | 2/2002 | O'Toole et al. ............. 709/222 |
| 6,377,990 B1 | * | 4/2002 | Slemmer et al. ............ 709/225 |
| 6,393,484 B1 | * | 5/2002 | Massarani ................... 709/227 |
| 6,603,769 B1 | * | 8/2003 | Thubert et al. ............. 370/401 |
| 6,678,732 B1 | * | 1/2004 | Mouko et al. .............. 709/227 |
| 6,697,326 B1 | * | 2/2004 | Britton et al. .............. 370/218 |

OTHER PUBLICATIONS

Plummer, David C., " An Ethernet Address Resolution Protocol or Converting Network Protocol Addresses to 48.bit Ethernet Address for Transmission on Ethernet Hardware," Cambridge, Massachusetts, Nov. 1982, pp. 1–8.

Symantec Corporation, pcANYWHERE32™ User Guide, Cupertino, California, 1993–1996, copyright notice page and page 2–5.

International Search Report, PCT/US02/06445, Jun. 26, 2002, 5 pages.

* cited by examiner

Primary Examiner—Man U. Phan
(74) Attorney, Agent, or Firm—Perkins Coie LLP

(57) ABSTRACT

A facility for communicating between two computing devices is described. The facility determines a first computing device has been connected to a distinguished computer network that is connected to a second level computer network. The facility then utilizes the distinguished computer network and the second level computer network to establish contact with a second computing device that is outside the distinguished computer network.

9 Claims, 9 Drawing Sheets

US 6,961,336 B2

CONTACTING A COMPUTING DEVICE OUTSIDE A LOCAL NETWORK

TECHNICAL FIELD

The present invention is directed to the field of computer networking.

BACKGROUND

A network typically enables nodes connected to the network to exchange messages, such as datagrams comprised of packets. A node may be a general-purpose computer system, such as a personal computer, or may be one of a variety of special-purpose devices, including firewalls, proxy servers, and other security devices; routers, switches, gateways, and other network control devices; packet sniffers and other network monitoring devices; and special-purpose network appliances. The networking schemes used in most networks permit a new node to be connected to an existing network.

Each node in a network is typically identified by a hardware address, also called a physical address. A hardware address is typically determined for the life a device by the device's manufacturer, and chosen in an attempt to render the hardware address unique within a typical network, if not unique in the world. For example, in an Ethernet network, nodes are identified by hardware addresses called media access control addresses ("MAC addresses"). A sender node that must send a datagram to a destination node that is connected to the same network as the sender node typically sends the datagram to the destination node using the hardware address of the destination node.

Two or more networks may be interconnected in order to permit nodes in each interconnected network to exchange datagrams with nodes in interconnected networks. Datagrams are generally exchanged between nodes of different networks using a higher-level address, called a logical addresses or protocol addresses. For example, where Internet Protocol is employed between interconnected networks, a node is identified to nodes in networks connected to its network by a logical address called an "IP address."

To send a datagram to a destination node of an interconnected network, a sender node uses a protocol address of the destination node by sending packets of the datagram to a receiver node in the network of the destination node designated to receive packets for this protocol address. The receiver node, in turn, determines the hardware address of the node having the destination protocol address, and sends the packets of the datagram to the destination node using the hardware address of the destination node.

Because the sender node uses the protocol address of the destination node to send a datagram to the destination node when these nodes are in separate interconnected networks, such sending is generally not possible when the protocol address of the destination node is unknown to the sender node. Even more pervasively, if the destination node has not yet been assigned a protocol address, it generally cannot receive datagrams from any nodes outside its network.

This can cause a problem for a sender node that needs to communicate with a destination node before the destination node has a protocol address, or before the protocol address of the destination node is known to the sender node. This problem arises commonly when a new device, such as a firewall, is connected to a network. A new device may generally be connected to a network merely by installing a network cable between a network port on the device and a network jack that is connected to the network. In view of the straightforwardness of this installation, it may be completed by almost anyone. At this point, however, the device does not have a protocol address that is coordinated with the network. In addition to needing to be configured with a protocol address that is coordinated with the network, the device may also need additional configuration in order to operate properly on the network. For example, a firewall may need to receive information describing the network, its nodes, and its uses in order to be able to effectively protect the network.

Conventional approaches to performing such needed configuration leave much to be desired. A first approach involves directing a networking expert to physically visit the connected device in order to manually configure it. The relative scarcity of networking experts generally causes this approach to have a high pecuniary cost, as well as significant time latency.

A second approach involves including a telephone modem in the device, and requiring the person connecting the device's network port to a network jack to also connect the device's modem to a standard telephone jack. The device uses the modem to establish a telephone connection to a configuration computer system, which configures the device via the telephone connection. This approach also has a significant pecuniary cost, as it requires the inclusion of additional hardware—the modem—in the device. It may also be difficult, in many cases, to successfully connect to the configuration computer system. For example, given the prevalence of non-standard telephone networks that use non-standard wiring to support extra telephone features, it may not be possible to connect the modem to a standard telephone jack. Furthermore, once the device is connected to a standard telephone jack, characteristics of the telephone network may make it impossible for the device to successfully connect to the configuration computer system.

In view of these disadvantages of conventional approaches, an effective approach to establishing communication with an unconfigured device connected to a network from a node in a connected network would have significant utility.

DETAILED DESCRIPTION

Figure 1:
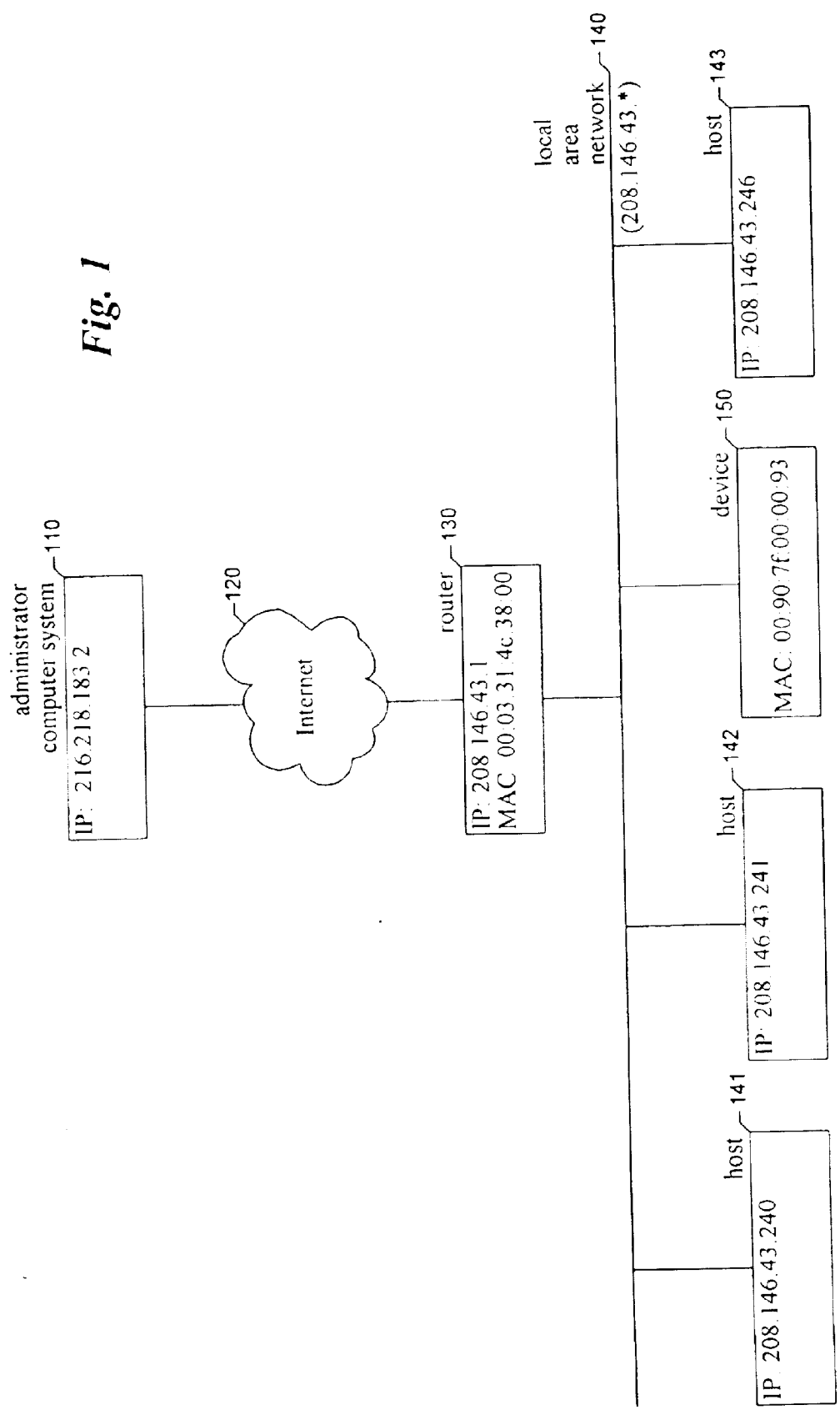
FIG. 1 is a network diagram showing a representative network in which the facility operates.

In representative embodiments, a facility such as a software facility enables two network nodes in separate networks to establish contact when one of the nodes is unconfigured. In one embodiment, referred to herein as the "inbound-initiated embodiment," the configured node initiates contact with the unconfigured node. In this embodiment, in accordance with the facility, the configured node sends a datagram to a target protocol address that (a) is one of the protocol addresses reserved for use by the network containing the unconfigured node (hereafter referred to merely as "the network"), and (b) is regarded as not actually being in use by any node in the network. The datagram is typically one that calls for a response, such as a ping datagram. Based upon the fact that its target protocol address is reserved for use in the network, the datagram is routed to a default gateway for the network designated to receive datagrams addressed to protocol addresses within the range of protocol addresses assigned for use by the network.

The default gateway, when it receives the datagram, determines that it does not possess a mapping from the target protocol address to an associated hardware address that it could use to immediately deliver the datagram. To obtain such a mapping, the default gateway broadcasts an address resolution protocol request ("ARP request") within the network, asking the node that uses the target protocol address to reply with its hardware address. If the network contained a node that was using the target protocol address, it would reply with such an "ARP response." When the unconfigured node determines, however, that no such ARP response is issued in response to the ARP request, it sets itself to use the target protocol request and issues its own ARP response indicating that the proper hardware address for the target protocol address is the hardware address of the unconfigured node.

When the default gateway receives the ARP response from the unconfigured node, it stores a mapping from the target protocol address to the physical address of the unconfigured node. The default gateway also uses the received physical address of the unconfigured node to deliver the datagram received from the configured node to the unconfigured node. When the unconfigured node receives the datagram, it sends a response datagram to the configured node. When the configured node receives the response datagram, which contains the target protocol address from the original datagram, it knows that it can communicate with the unconfigured node at that protocol address. At this point, the configured node can send additional datagrams to the unconfigured node at this protocol address.

For example, the configured node may send datagrams to the configured node that have the effect of configuring the unconfigured node. In some embodiments, the unconfigured node checks these configuration datagrams from the configured node for authentication information to ensure that the configuration datagrams were transmitted from a node authorized to configure the unconfigured node.

In another embodiment, referred to herein as the "outbound-initiated embodiment," the unconfigured node initiates contact with the configured node. In this embodiment, in accordance with the facility, the unconfigured node attempts to identify the following for use in contacting the configured node: a protocol address that it can use in the network to which it is directly connected, and a physical address for a gateway of that network. In order to do so, the unconfigured node, in promiscuous mode, monitors packets traveling in its network. From those packets, it extracts protocol addresses, used by the facility to guess an unused protocol address within the network, and hardware addresses, used by the facility to guess the physical address of one or more gateways within the network. In some embodiments, the unconfigured node also sends stimulus packets into the network in order to elicit such traffic. In some embodiments, the facility sends one or more requests, such as a DHCP request, designed to obtain explicit notification of an available protocol address in the network, the physical address of a gateway in the network, or both.

After the unconfigured node has monitored network traffic and extracted protocol and physical addresses, the unconfigured node generates a set of packets addressed to a predetermined protocol address for the configured node, preferably stored in nonvolatile memory of the unconfigured node. These packets contain a logical source address guessed to be unused within the network based upon the protocol addresses that were seen to be in use in the network. Each of these packets has a physical destination address corresponding to one of the physical addresses seen in the monitored network traffic. For the packet whose physical destination address is the actual physical address of a gateway in the network, this packet will be conveyed to the Internet, and may be routed to the configured node. If so, the configured node can take note of the contact and store any additional information included in the packet by the unconfigured node. The configured node may also communicate with the unconfigured node using the source protocol address of the packet it received. Indeed, this protocol address may be used by the configured node to configure the unconfigured node.

By establishing contact in this manner, the facility overcomes the disadvantages of the conventional approaches discussed above. In particular, the facility generally makes it unnecessary for a networking expert to physically visit the unconfigured node in order to configure it. The facility generally also makes it unnecessary to include in the unconfigured node extra hardware for making a telephone connection, or another type of "out of band" connection with the configured node.

To better illustrate the facility and its implementation, its operation in conjunction with an example is discussed herein.

FIG. 1 is a network diagram showing a representative network in which the facility operates. The diagram shows a local area network 140. Local area network 140 is a Class C network, for which 254 useable IP addressees (logical addresses) are reserved. These are 208.146.43.*, or 208.146.43.1 through 208.154.43.254. Connected to the local area networks are three hosts 141–143 having IP addresses in this range. The local area network is connected to the Internet 120 via a router 130. The router has an IP address of 208.146.43.1, and a MAC address (hardware address) of 00:03:31:4C:38:00. A device 150 having MAC address 00:90:7F:00:00:93 is attached to the local area network. The device may be a firewall, or a device of a variety of other types. The facility seeks to establish communication between device 150 and a computer system or other device that is connected to the Internet and external to the local area network. In FIG. 1, the external device is shown as an administrator computer system 110, having an IP address of 216.218.183.2.

It should be noted that the network configuration shown in FIG. 1 is merely exemplary, and that the facility may be straightforwardly adapted to operate in networks having a variety of different configurations.

Figure 2:
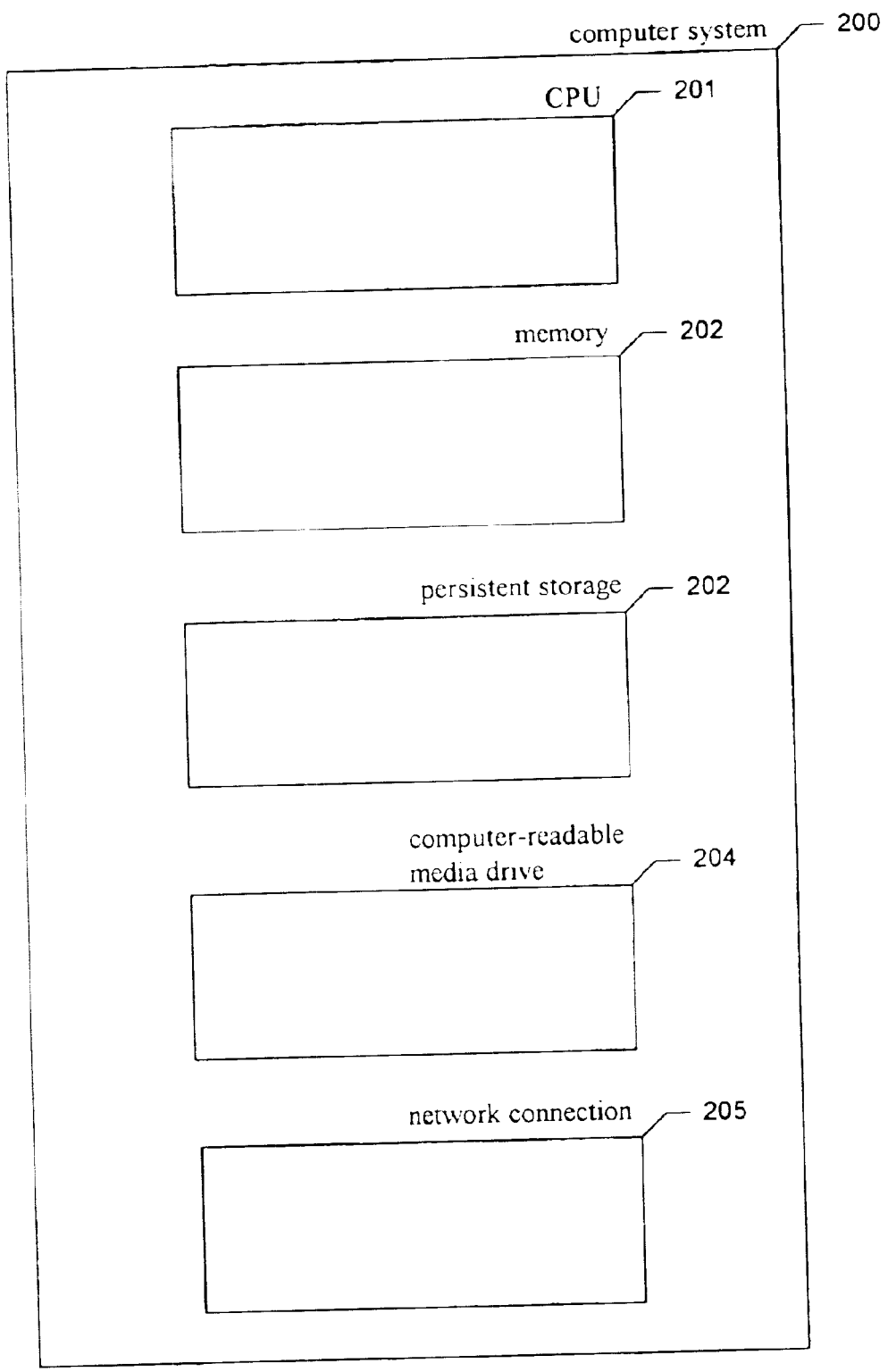
FIG. 2 is a block diagram showing some of the components typically incorporated in at least some of the computer systems and other devices shown in FIG. 1.

FIG. 2 is a block diagram showing some of the components typically incorporated in at least some of the computer systems and other devices shown in FIG. 1. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are preferably used to support the operation of the facility, those skilled in the art will appreciate that the facility may be implemented using devices of various types and configurations, and having various components.

Figure 3A:
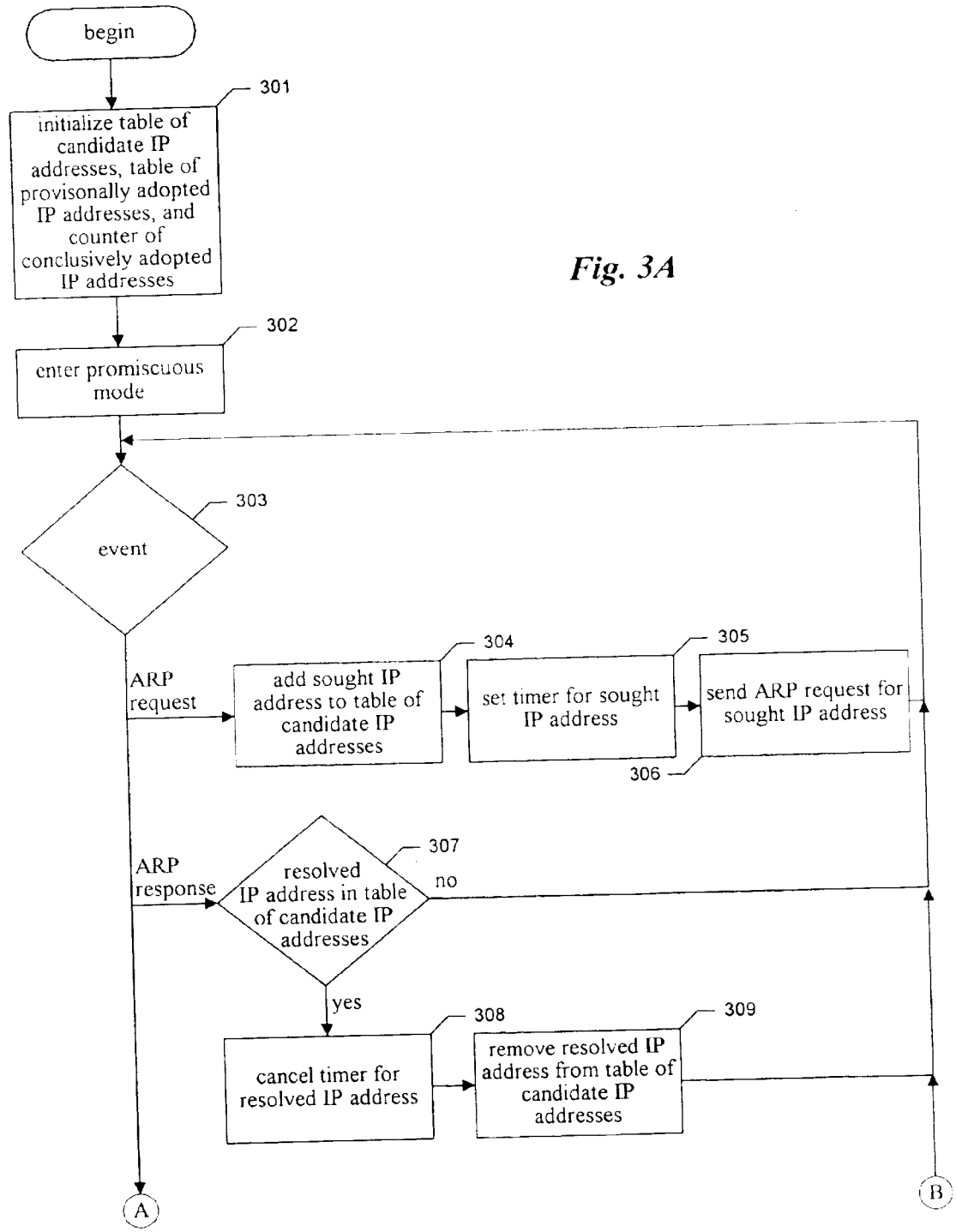
FIGS. 3A–3C collectively comprise a flow diagram showing steps typically performed by the facility in the device 150 in order to establish contact with the administrator computer system 110 as part of an inbound-initiated embodiment.
Figure 3B:
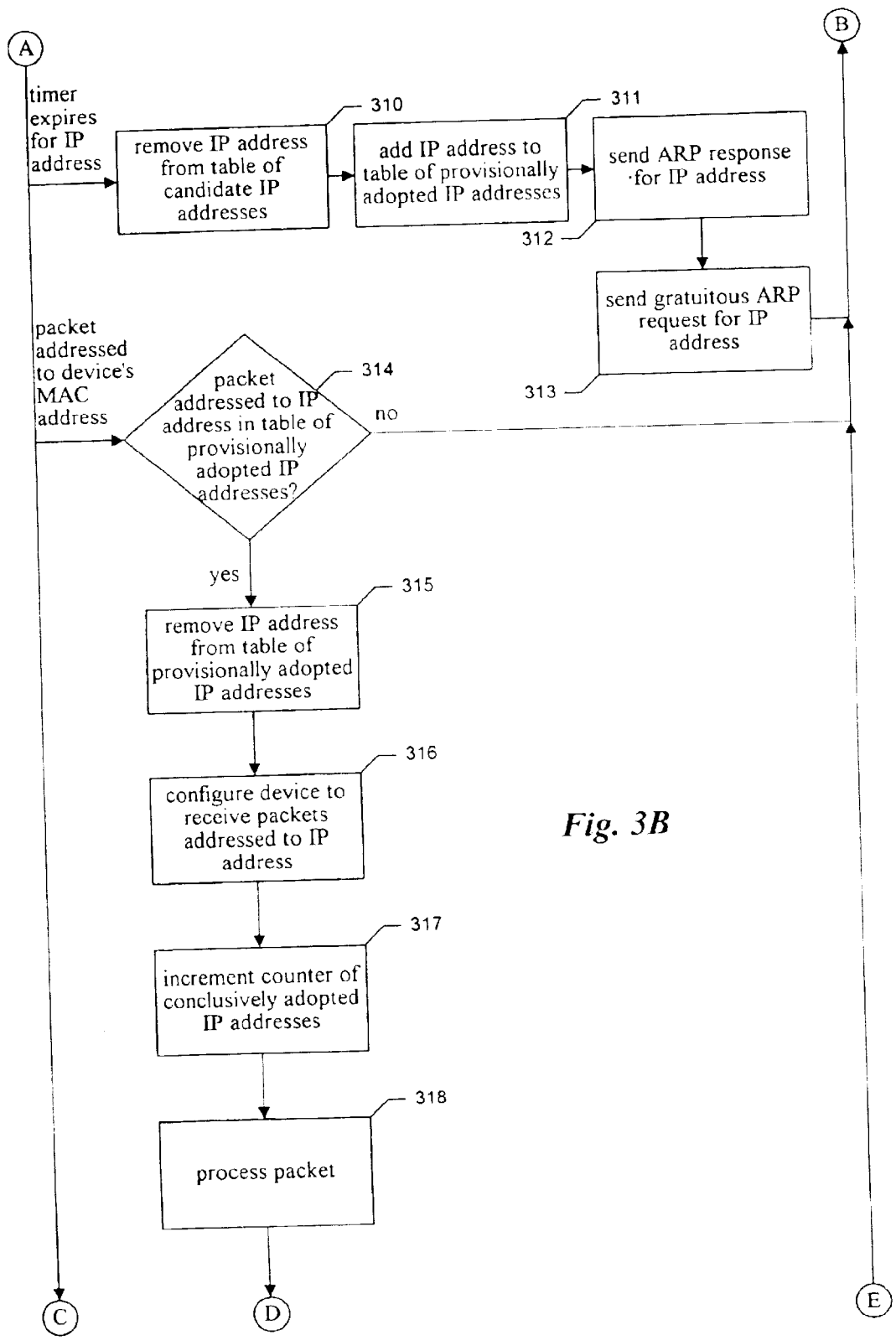
Figure 3C:
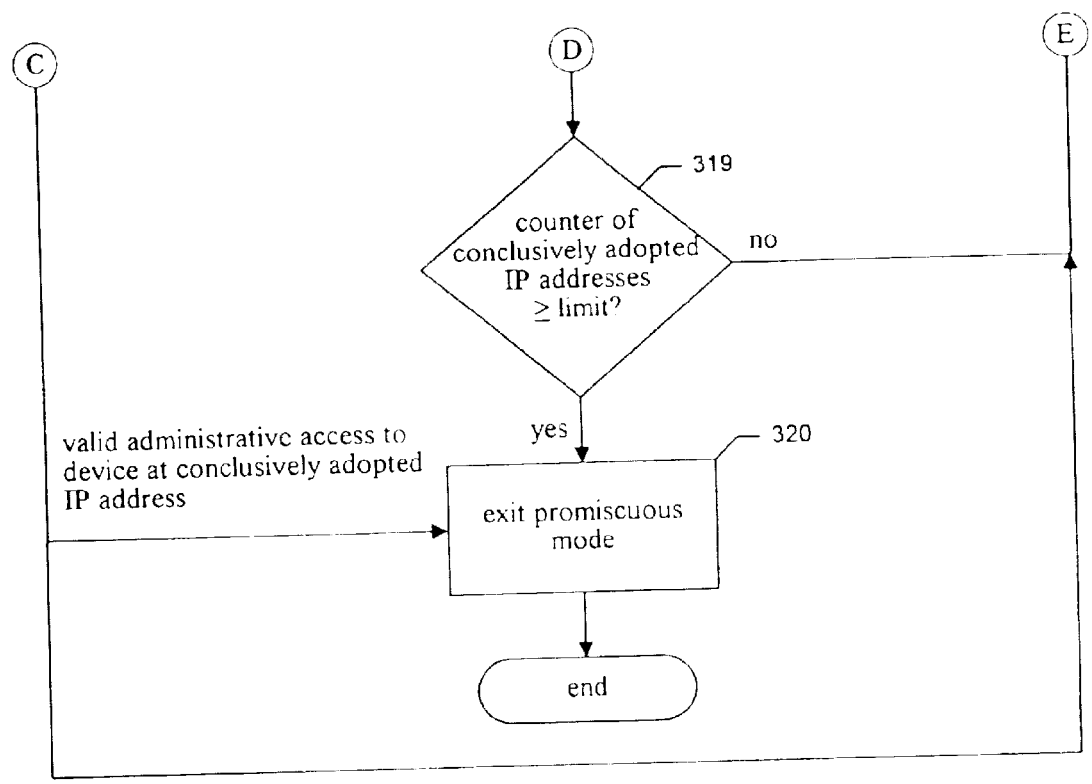

FIGS. 3A–3C collectively comprise a flow diagram showing steps typically performed by the facility in the device 150 in order to establish contact with the administrator computer system 110. It should be noted that this particular arrangement of steps is merely exemplary, and that in various embodiments, the facility performs a subset of these steps, a superset of these steps, a rearrangement of these steps, and/or a substitution of some of these steps. As one example, various embodiments of the facility utilize various schemes for performing event processing, such as but not limited to message processing loops, hardware and/or software interrupts, and timers. The facility may perform these steps in a single process or in multiple processes, and in a single thread or multiple threads.

In step 301, the facility initializes a table of candidate IP addresses under consideration by the facility, a table of provisionally adopted IP addresses waiting to be confirmed, and a counter of conclusively adopted IP addresses that have been confirmed. In step 302, the facility places the device's network connection in promiscuous mode in order to monitor all traffic on the local area network, including unicast packets addressed MACs other than that of the device, in addition to and unicast packets addressed to the MAC of the device and broadcast packets. In step 303, the facility waits for the occurrence of a monitored event. The processing of various types of monitored events is discussed below.

If the monitored event that occurs in step 303 is the receipt of an ARP request, the facility continues in step 304. An example of such an ARP request is shown below in Table 1.

TABLE 1

| 1 | Frame 22 (60 on wire, 60 captured) |
| 2 | Arrival Time: Jan 31, 2001 13:54:36.4541 |
| 3 | Time delta from previous packet: 30.140000 seconds |
| 4 | Frame Number: 22 |
| 5 | Packet Length: 60 bytes |
| 6 | Capture Length: 60 bytes |
| 7 | Ethernet II |
| 8 | Destination: ff:ff:ff:ff:ff:ff (ff:ff:ff:ff:ff:ff) |
| 9 | Source: 00:03:31:4c:38:00 (00:03:31:4c:38:00) |
| 10 | Type: ARP (0x0806) |
| 11 | Trailer: 00000000000000000000000000000000... |
| 12 | Address Resolution Protocol (request) |
| 13 | Hardware type: Ethernet (0x0001) |
| 14 | Protocol type: IP (0x0800) |
| 15 | Hardware size: 6 |
| 16 | Protocol size: 4 |
| 17 | Opcode: request (0x0001) |
| 18 | Sender hardware address: 00:03:31:4c:38:00 |
| 19 | Sender protocol address: 208.146.43.242 |

TABLE 1-continued

| 20 | Target hardware address: 00:00:00:00:00:00 | |
| 21 | Target protocol address: 208.146.43.242 | |
| 22 | | |
| 23 | 0 ffff ffff ffff 0003 314c 3800 0806 0001 | ........1L8..... |
| 24 | 10 0800 0604 0001 0003 314c 3800 d092 2bf1 | ........1L8...+. |
| 25 | 20 0000 0000 0000 d092 2bf2 0000 0000 0000 | ........+....... |
| 26 | 30 0000 0000 0000 0000 0000 0000 | ............ |

It should be noted that, in Table 1 and the tables that follow, the actual data contained in the corresponding packet is shown in the final lines of the table, while an interpretation of the contents of that packet are shown in the preceding lines. For example, in Table 1, the actual contents of the ARP request packet are shown in lines 23–26, and an interpretation of the contents of the packet are shown in lines 1–21.

The Address Resolution Protocol ("ARP") standard published as RFCs 826 and 1122 and STD 37, is described in detail at Hall, Eric A., Internet Case Protocols: The Definitive Guide, Sebastopol, Calif.: O'Reilly & Associates, Inc., 2000, pp. 98–113, and Spurgeon, Charles E., Ethernet: The Definitive Guide, Sebastopol, Calif.: O'Reilly & Associates, Inc., 2000, pp. 36–38.

It can be seen in line 10 that the packet is an ARP packet, and in line 17 that it is more particularly an ARP request. Lines 9 and 18 indicate that the ARP request was sent from the MAC address of the router 130, while line 8 indicates that the ARP request is broadcast to all MAC addresses on the local area network. Line 21 indicates that this ARP request seeks a response from the node using the IP address 208.146.43.242.

This ARP request was generated by the router in response to receiving from the administrator computer system a datagram addressed to IP address 208.146.43.242, such as a ping datagram. The administrator computer system sent the datagram in order to establish communication with the device using the IP address 208.146.43.242, selected by the administrator computer system because it is within the address range of the local area network and believed to be unused among the nodes in the local area network.

In step 304, the facility adds the IP address sought by the received ARP request, here 208.146.43.242, to a table of candidate IP addresses. In step 305, the facility sets a timer associated with this sought IP address to expire after a waiting period of a certain length, such as three seconds. In step 306, the facility sends an ARP request from the device for the sought IP address. If the device later receives an ARP response for the sought IP address, either as the result of the ARP request received by the device or as the result of the ARP request sent by the device, then the device will know that this IP address is in use in the local area network, and the device will not adopt this IP address. The facility sends its own ARP request in step 306 in case the local area network is configured in such a way that the device will not be able to see a response to the router's ARP request, even though the device is operating in promiscuous mode. This can occur, for example, where the local area network is a switched network, in which all packets conveyed by the network do not necessarily reach the network connections of all the nodes on the network. After step 306, the facility continues in step 303 to wait for the next monitored event.

Table 2 below shows a sample ARP request sent by the facility in step 306.

TABLE 2

```
1   Frame 23 (60 on wire, 60 captured)
2       Arrival Time: Jan 31, 2001 13:54:36.4541
3       Time delta from previous packet: 0.000000 seconds
4       Frame Number: 23
5       Packet Length: 60 bytes
6       Capture Length: 60 bytes
7       Ethernet II
8           Destination: ff:ff:ff:ff:ff:ff (ff:ff:ff:ff:ff:ff)
9           Source: 00:90:7f:00:00:93 (fbd)
10          Type: ARP (0x0806)
11          Trailer: 00000000000000000000000000000000...
12      Address Resolution Protocol (request)
13          Hardware type: Ethernet (0x0001)
14          Protocol type: IP (0x0800)
15          Hardware size: 6
16          Protocol size: 4
17          Opcode: request (0x0001)
18          Sender hardware address: 00:90:7f:00:00:93
19          Sender protocol address: 192.168.253.1
20          Target hardware address: 00:00:00:00:00:00
21          Target protocol address: 208.146.43.242
22
23      0  ffff ffff ffff 0090 7f00 0093 0806 0001     ................
24      10 0800 0604 0001 0090 7f00 0093 c0a8 fd01     ................
25      20 0000 0000 0000 d092 2bf2 0000 0000 0000     ........+.......
26      30 0000 0000 0000 0000 0000 0000               ............
```

It can be seen in lines 10 and 17 that the packet shown in Table 1 is an ARP request. It can be seen from lines 8 and 9 that the packet is broadcast within the local area network from the MAC address of the device. It can be seen in line 21 that the sought address in this ARP request is the same as the sought address in the ARP request shown in Table 2, that is, 208.146.43.242.

If the monitored event that occurs in step 303 is an ARP response, then the facility continues in step 307. In step 307, if the IP address resolved by the ARP response is in the table of candidate IP addresses, then the facility continues in step 308, else the facility continues in step 303 to wait for the next monitored event. In step 308, the facility cancels the timer for the IP address resolved in the received ARP response. In step 309, the facility removes the IP address resolved in the received ARP response from the table candidate IP addresses. At this point, because an ARP response has been received indicating that the IP address in question is in use in the network, the facility eliminates this IP address as a candidate for adoption. After step 309, the facility continues in step 303 to wait for the next monitored event.

If the monitored event that occurred in step 303 is the expiration of a timer for a candidate IP address, then the facility continues in step 310. In steps 310–313, the facility provisionally adopts this IP address. In step 310, the facility removes the IP address to which the timer corresponds from the table of candidate IP addresses. In step 311, the facility adds this IP address to a table of provisionally adopted IP addresses. In step 312, the facility sends an ARP response for this IP address to the node that sent the original ARP request for this IP address.

A sample ARP response sent in step 312 is shown below in Table 3.

TABLE 3

```
1   Frame 24 (60 on wire, 60 captured)
2       Arrival Time: Jan 31, 2001 13:54:39.2241
3       Time delta from previous packet: 2.770000 seconds
4       Frame Number: 24
```

TABLE 3-continued

```
5       Packet Length: 60 bytes
6       Capture Length: 60 bytes
7       Ethernet II
8           Destination: 00:03:31:4c:38:00 (00:03:31:4c:38:00)
9           Source: 00:90:7f:00:00:93 (fbd)
10          Type: ARP (0x0806)
11          Trailer: 00000000000000000000000000000000...
12      Address Resolution Protocol (reply)
13          Hardware type: Ethernet (0x0001)
14          Protocol type: IP (0x0800)
15          Hardware size: 6
16          Protocol size: 4
17          Opcode: reply (0x0002)
18          Sender hardware address: 00:90:7f:00:00:93
19          Sender protocol address: 208.146.43.242
20          Target hardware address: 00:03:31:4c:38:00
21          Target protocol address: 208.146.43.242
22
23      0  0003 314c 3800 0090 7f00 0093 0806 0001     ..1L8.........
24      10 0800 0604 0002 0090 7f00 0093 d092 2bf2     ..............+.
25      20 0003 314c 3800 d092 2bf2 0000 0000 0000     ..1L8...+.......
26      30 0000 0000 0000 0000 0000 0000               ............
```

It can be seen in lines 10 and 17 that the packet shown in Table 3 is an ARP response (or "reply"). It can be seen in lines 8 and 9 that the ARP response is sent from the MAC address of the device to the MAC address of the router that sent the original ARP request. Finally, it can be seen in lines 18 and 19 that the ARP response identifies the device as the user of IP address 208.146.43.242. When it receives the ARP request shown in Table 3, the router adds an entry to its ARP cache that maps this IP address to the MAC address of the device, enabling datagrams received by the router addressed to this IP addressed to be forwarded to the device. An ARP request, broadcast to all nodes on the local area network, instructs nodes on the network whose ARP cache contains this IP address to change the MAC address associated with the IP address in cache to the MAC address of the device.

In step 313, in order to update the ARP cache of other nodes in the local area network, the facility sends a gratuitous ARP request for this IP address. Gratuitous ARP requests are described at Hall, pp. 104, 110–111, and at http://www.ecse.rpi.edu/Courses/S98/35696/i06_arp/sld012.htm. After step 313, the facility continues through connector B at step 303 to wait for the next monitored event.

Table 4 below shows a sample gratuitous ARP request sent by the facility in 313.

TABLE 4

```
1   Frame 25 (60 on wire, 60 captured)
2       Arrival Time: Jan 31, 2001 13:54:39.2241
3       Time delta from previous packet: 0.000000 seconds
4       Frame Number: 25
5       Packet Length: 60 bytes
6       Capture Length: 60 bytes
7       Ethernet II
8           Destination: ff:ff:ff:ff:ff:ff (ff:ff:ff:ff:ff:ff)
9           Source: 00:90:7f:00:00:93 (fbd)
10          Type: ARP (0x0806)
11          Trailer: 00000000000000000000000000000000...
12      Address Resolution Protocol (request)
13          Hardware type: Ethernet (0x0001)
14          Protocol type: IP (0x0800)
15          Hardware size: 6
16          Protocol size: 4
17          Opcode: request (0x0001)
18          Sender hardware address: 00:90:7f:00:00:93
19          Sender protocol address: 208.146.43.242
20          Target hardware address: 00:00:00:00:00:00
21          Target protocol address: 208.146.43.242
```

TABLE 4-continued

| 22 | | |
|---|---|---|
| 23 | 0 ffff ffff ffff 0090 7f00 0093 0806 0001 | ................ |
| 24 | 10 0800 0604 0001 0090 7f00 0093 d092 2bf2 | ...............+. |
| 25 | 20 0000 0000 0000 d092 2bf2 0000 0000 0000 | ........+....... |
| 26 | 30 0000 0000 0000 0000 0000 0000 | ............ |

It can be seen from lines 10 and 17 that the packet shown in Table 4 is an ARP request. It can be seen in lines 19 and 21 that the sender and target IP addresses for the ARP request are the same, thus identifying the ARP request as a gratuitous ARP request. When it is received by other nodes on the local area network, having the IP address 208.146.43.242 in their ARP table, the MAC for this IP address in the ARP table will be replaced with the MAC address of the device.

If the monitored event in step 303 is a packet addressed to the device's MAC address, then the facility continues in step 314. In step 314, if the received packet is addressed to an IP address that is in the table of provisionally adopted IP addresses, then the facility continues in step 315, else the facility continues through connector B at step 303 to wait for the next monitored event. Receiving such a packet indicates that a provisionally adopted IP address has been successfully adopted. Table 5 below shows an example of such a packet, sent from the router and containing the ping datagram sent from the administrator computer system.

TABLE 5

| 1 | Frame 26 (98 on wire, 98 captured) | |
|---|---|---|
| 2 | Arrival Time: Jan 31, 2001 13:54:46.2841 | |
| 3 | Time delta from previous packet: 7.060000 seconds | |
| 4 | Frame Number: 26 | |
| 5 | Packet Length: 98 bytes | |
| 6 | Capture Length: 98 bytes | |
| 7 | Ethernet II | |
| 8 | Destination: 00:90:7f:00:00:93 (fbd) | |
| 9 | Source: 00:03:31:4c:38:00 (00:03:31:4c:38:00) | |
| 10 | Type: IP (0x0800) | |
| 11 | Internet Protocol | |
| 11 | Version: 4 | |
| 11 | Header length: 20 bytes | |
| 12 | Differentiated Services Field: 0x00 (DSCP 0x00: Default; ECN: 0x00) | |
| 13 | 0000 00.. = Differentiated Services Codepoint: Default (0x00) | |
| 13 | .... ..0. = ECN-Capable Transport (ECT) : 0 | |
| 14 | .... ...0 = ECN-CE: 0 | |
| | Total Length: 84 | |
| 14 | Identification: 0xc324 | |
| 15 | Flags: 0x00 | |
| | .0.. = Don't fragment: Not set | |
| 15 | ..0. = More fragments: Not set | |
| 16 | Fragment offset: 0 | |
| 16 | Time to live: 50 | |
| 17 | Protocol: ICMP (0x01) | |
| 17 | Header checksum: 0x3923 (correct) | |
| 18 | Source: mars.he.net (216.218.183.2) | |
| 18 | Destination: 208.146.43.242 (208.146.43.242) | |
| 19 | Internet Control Message Protocol | |
| 19 | Type: 8 (Echo (ping) request) | |
| 20 | Code: 0 | |
| 20 | Checksum: 0xcd21 (correct) | |
| 21 | Identifier: 0x9b27 | |
| 22 | Sequence number: 00:00 | |
| 22 | Data (56 bytes) | |
| 22 | | |
| 23 | 0 0090 7f00 0093 0003 314c 3800 0800 4500 | ........1L8...E. |
| 23 | 10 0054 c324 0000 3201 3923 d8da b702 d092 | .T.$..2.9#...... |
| 24 | 20 2bf2 0800 cd21 9b27 0000 c082 783a 5ef6 | +....!.'....x:^. |
| 24 | 30 0d00 0809 0a0b 0c0d 0e0f 1011 1213 1415 | ................ |
| 25 | 40 1617 1819 1a1b 1c1d 1e1f 2021 2223 2425 | ........ !"#$% |
| 26 | 50 2627 2829 2a2b 2c2d 2e2f 3031 3233 3435 | &'()*+,-./012345 |
| 26 | 60 3637 | 67 |
| 27 | | |
| 28 | | |
| 29 | | |
| 30 | | |
| 31 | | |
| 32 | | |
| 33 | | |
| 33 | | |
| 34 | | |
| 35 | | |
| 36 | | |
| 37 | | |
| 38 | | |
| 39 | | |
| 40 | | |
| 41 | | |
| 42 | | |
| 43 | | |

It can be seen in line 30 that the packet is a ping request. It can be seen in line 27 that the ping request originated at the IP address of the administrator computer system, 216.218.183.2. It can be seen in line 28 that the ping request is addressed to the adopted IP address, 208.146.43.242. It can be seen in lines 8 and 9 that the ping request was most recently sent from the MAC address of the router to the MAC address of the device.

In steps 315–317, the facility conclusively adopts the IP address. In step 315, the facility removes the IP address from the table of provisionally adopted IP addresses. In step 316, the facility configures the device to receive packets addressed to the IP address. In step 317, the facility increments the counter of conclusively adopted IP addresses. In step 318, the facility processes the packet. In the case of a ping request, the facility processes the packet by sending a ping reply. Table 6 below shows an example of such a ping reply.

TABLE 6

| 1 | Frame 28 (98 on wire, 98 captured) |
|---|---|
| 2 | Arrival Time: Jan 31, 2001 13:54:56.3241 |
| 3 | Time delta from previous packet: 0.000000 seconds |
| 4 | Frame Number: 28 |
| 5 | Packet Length: 98 bytes |
| 6 | Capture Length: 98 bytes |
| 7 | Ethernet II |
| 8 | Destination: 00:03:31:4c:38:00 (00:03:31:4c:38:00) |
| 9 | Source: 00:90:7f:00:00:93 (fbd) |
| 10 | Type: IP (0x0800) |
| 11 | Internet Protocol |
| 12 | Version: 4 |
| 13 | Header length: 20 bytes |

TABLE 6-continued

| | | |
|---|---|---|
| 14 | Differentiated Services Field: 0x00 (DSCP 0x00: Default; ECN: 0x00) | |
| 15 | 0000 00.. = Differentiated Services Codepoint: Default (0x00) | |
| 16 | .... ..0. = ECN-Capable Transport (ECT) : 0 | |
| 17 | .... ...0 = ECN-CE: 0 | |
| 18 | Total Length: 84 | |
| 19 | Identification: 0x0269 | |
| 20 | Flags: 0x00 | |
| 21 | .0.. Don't fragment: Not set | |
| 22 | ..0. = More fragments: Not set | |
| 23 | Fragment offset: 0 | |
| 24 | Time to live: 64 | |
| 23 | Protocol: ICMP (0x01) | |
| 26 | Header checksum: 0xebde (correct) | |
| 27 | Source: 208.146.43.242 (208.146.43.242) | |
| 28 | Destination: mars.he.net (216.218.183.2) | |
| 29 | Internet Control Message Protocol | |
| 30 | Type: 0 (Echo (ping) reply) | |
| 31 | Code: 0 | |
| 32 | Checksum: 0x799b (correct) | |
| 33 | Identifier: 0x9e27 | |
| 34 | Sequence number: 00:00 | |
| 35 | Data (56 bytes) | |
| 36 | | |
| 37 | 0 0003 314c 3800 0090 7f00 0093 0800 4500 | ..1L8.........E. |
| 38 | 10 0054 0269 0000 4001 ebde d092 2bf2 d8da | .T.i..@.....+... |
| 39 | 20 b702 0000 799b 9e27 0000 ca82 783a ac7c | ....y..'....x:.\| |
| 40 | 30 0e00 0809 0a0b 0c0d 0e0f 1011 1213 1415 | ................ |
| 41 | 40 1617 1819 1a1b 1c1d 1e1f 2021 2223 2425 | .......... !"#$% |
| 42 | 50 2627 2829 2a2b 2c2d 2e2f 3031 3233 3435 | &'()*+,-./012345 |
| 43 | 60 3637 | 67 |

It can be seen in line 30 that the packet shown in Table 6 is a ping reply. It can be seen in line 27 and 28 that the ping reply sent from the IP address adopted by the device to the IP address of the administrator computer system. It can be seen in lines 8 and 9 that the ping request is sent first to the MAC address of the router from the MAC address of the device. When it is received by the router, it is forwarded to the administrator computer system using the destination IP address. When the ping reply is received in the administrator computer system, in some embodiments, the administrator computer system uses the adopted IP address to initiate administrative access to the device, such as for the purpose of configuring the device.

In step 319, the facility determines whether additional IP addresses should be adopted: if the counter of conclusively adopted IP addresses has reached a predetermined limit, such as 8, then the facility continues in step 320, else the facility continues through connectors E and B at step 303 to wait for the next monitored event. By permitting the adoption of multiple IP addresses, the facility is able to establish communications with the administrator computer system even if the facility has previously adopted an address based upon network traffic originated by some other computer system.

If the monitored event is a valid administrative access to the device at a conclusively adopted IP address, then the facility continues in step 320. Such administrative access may be made, for example, using a shared-secret protocol, such as Kerberos, to authenticate the administrator computer system as being authorized to perform the administrative access. In step 320, the facility exits promiscuous mode, returning to single address mode in which unicasts addressed to other destination MAC addresses are filtered out. After step 320, these steps conclude.

Figure 4:
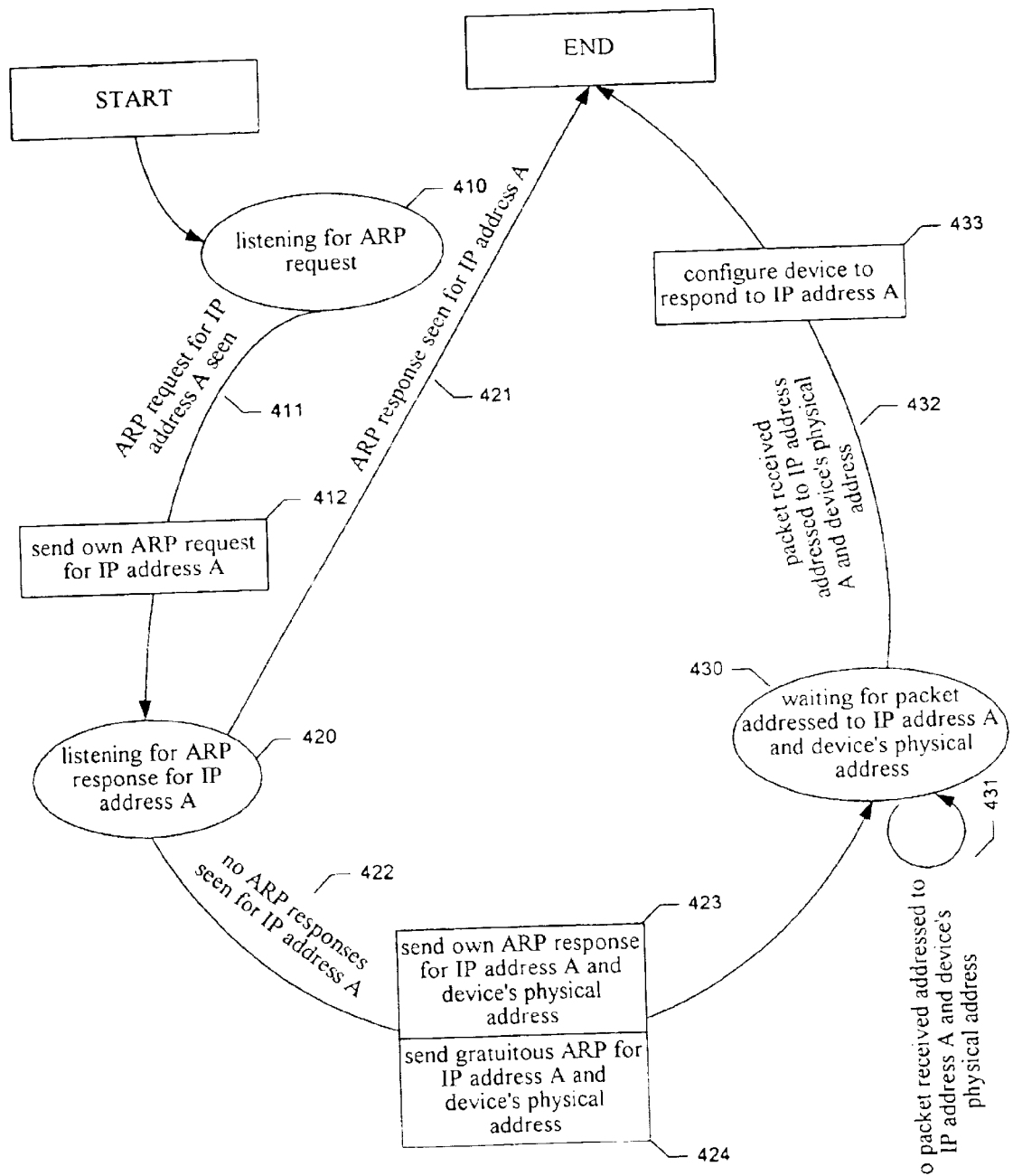
FIG. 4 is a state diagram portraying the adoption of a single IP address by the facility.

FIG. 4 is a state diagram portraying the adoption of a single IP address by the facility. In the state diagram, each oval corresponds to a state, and each arrow corresponds to a transition between states. Transitions are labeled with conditions required to effect the transition. Transitions may contain one or more steps, shown in rectangles, to be performed as part of the transition.

From the start block, the facility transitions to state 410, in which it is listening for an ARP request broadcast on the local area network. When an ARP request for a particular IP address—here called "address A"—is received, the facility follows transition 411 to state 420. As part of the transition, the facility sends its own ARP request for IP address A in step 412 to ensure that, if ARP responses for IP addresses are transmitted in the network, the device will receive at least one of them.

In state 420, IP address A is a candidate IP address, and the facility is listening for an ARP response for IP address A. If an ARP response is received for IP address A, IP address A is already in use by a node in the network, and the facility follows transition 421 to the end block. If, on the other hand, no ARP responses are seen for IP address A, the facility follows transition 422 from state 420 to state 430. As part of transition 422, the facility performs steps 423 and 424. In step 423, the facility sends its own ARP response for IP address A containing the devices physical address. In step 424, the facility sends a gratuitous ARP for IP address A containing the device's physical address.

In state 430, IP address A is a provisionally adopted IP address, and the facility is waiting for a packet addressed to IP address A and the device's physical address. If no packet is received addressed to IP address A and the device's physical address, the facility follows transition 431 back to state 430. If, on the other hand, a packet is received addressed to IP address A and the device's physical address, then the facility follows transition 432 to the end block. As part of transition 432, the facility configures the device to respond to IP address A in step 433.

It should be noted that FIG. 4 portrays the state of the facility with respect to single IP address, though the facility may simultaneously be at different stages of adopting multiple IP addresses.

Figure 5A:
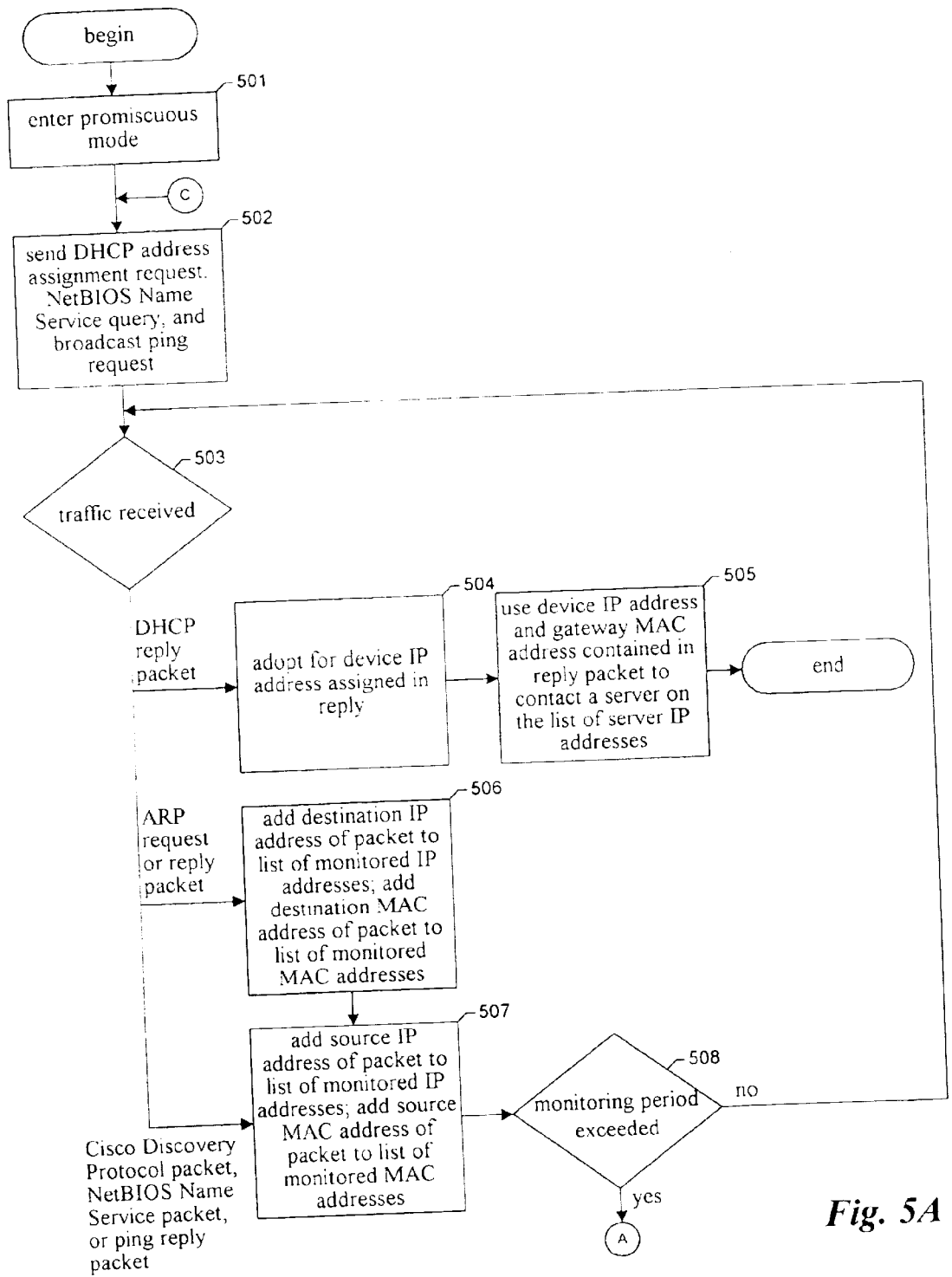
FIGS. 5A–5C collectively comprise a flow diagram showing steps typically performed by the facility in the device 150 in order to establish contact with the administrator computer system 110 as part of an outbound-initiated embodiment.
Figure 5B:
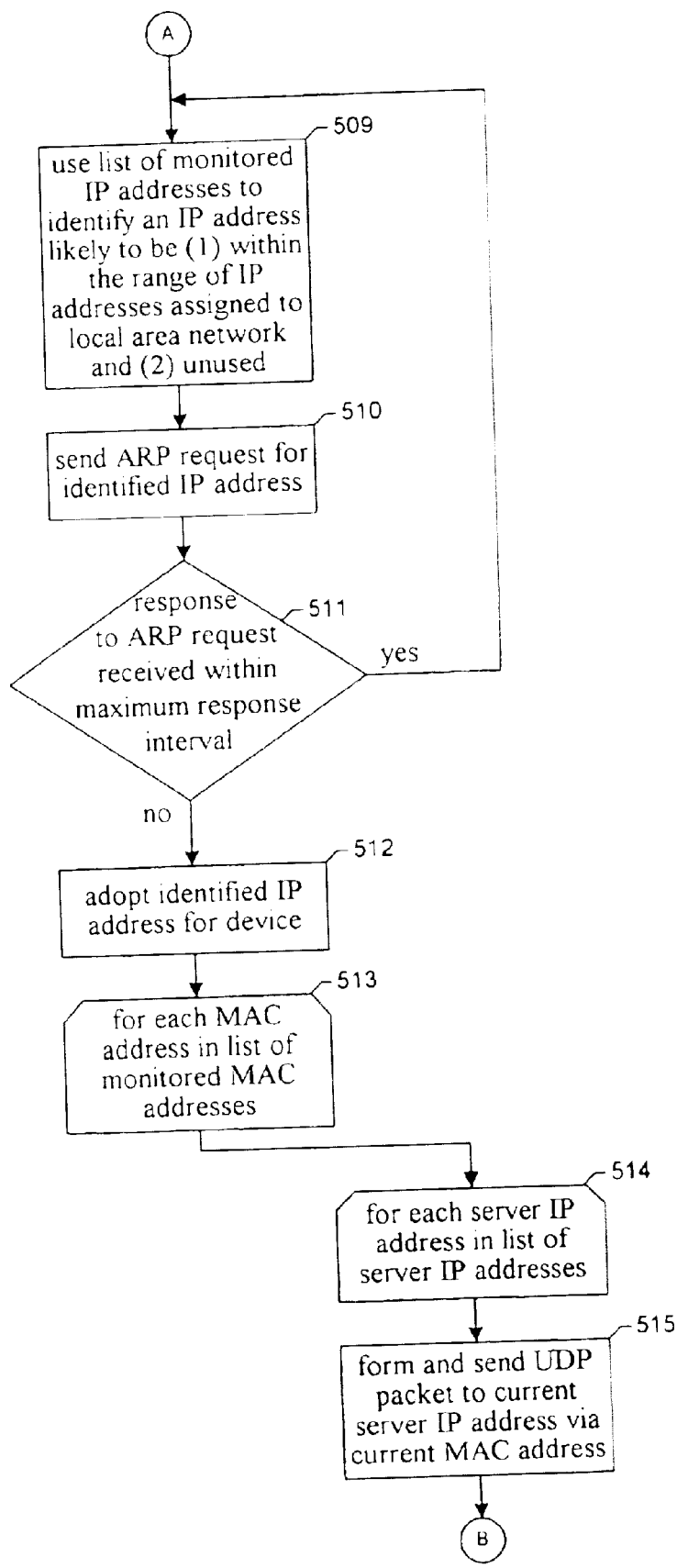
Figure 5C:
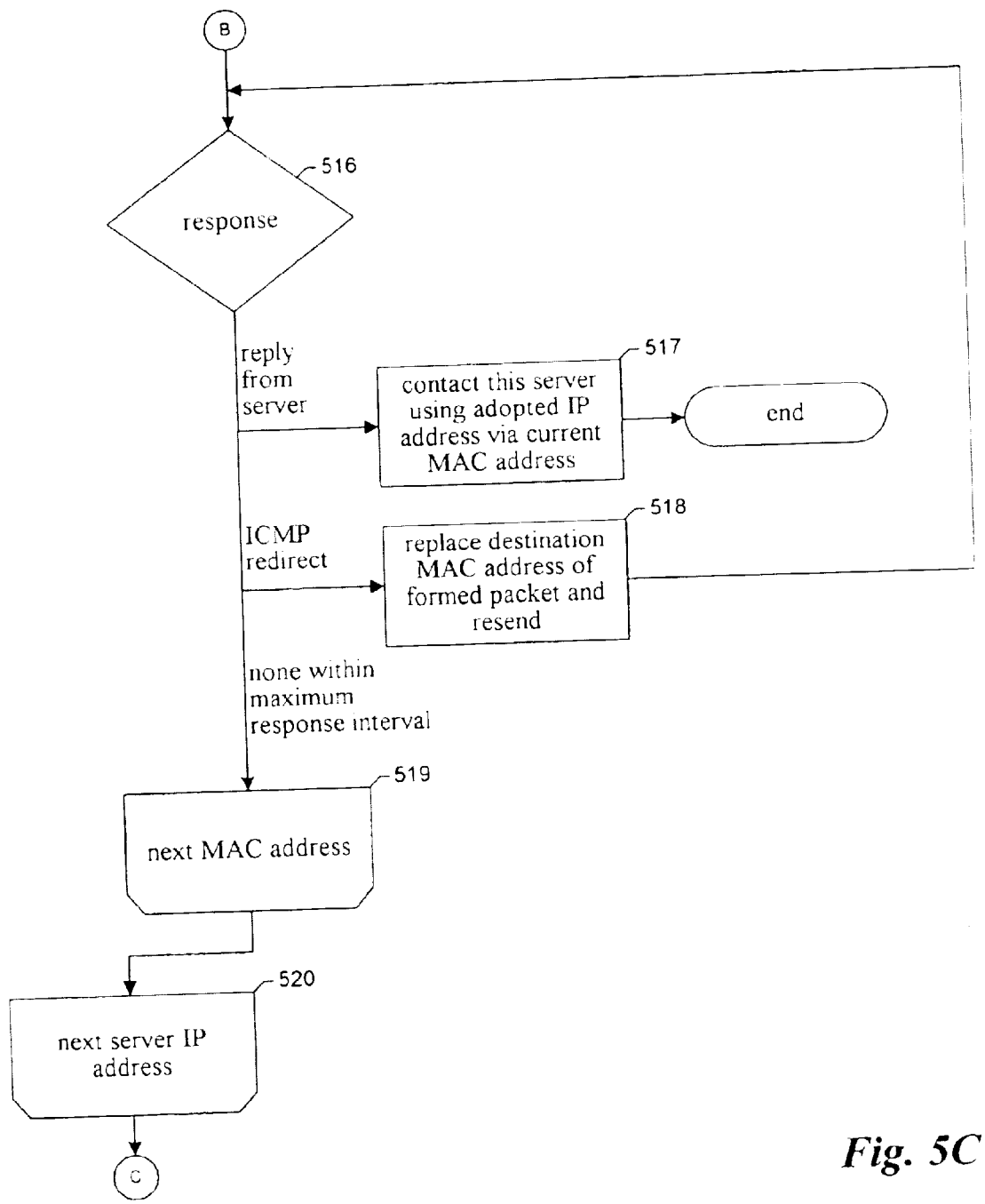

FIGS. 5A–5C collectively comprise a flow diagram showing steps typically performed by the facility in the device 150 in order to establish contact with the administrator computer system 110 as part of an outbound-initiated embodiment. In step 501, the facility enters promiscuous mode in order to monitor all traffic transported by the network to which the unconfigured device is connected. In step 502, the facility sends a DHCP address assignment request, a NetBIOS Name Service Query, and a broadcast ping request.

The DHCP address assignment request is a request for a DHCP server operating in the network to respond with a dynamically-allocated IP address within the network for the unconfigured device to use, and the MAC address of a gateway in the network. The DHCP protocol is defined in R. Droms, "RFC 2131: Dynamic Host Configuration Protocol," March 1997, available at http://www.ieff.org/rfc/rfc2131.txt, and further described at http://www.dhcp.org/.

A NetBIOS Name Service Query asks network nodes running a Microsoft Operating System to respond with IP addresses associated with names in the NetBIOS namespace. NetBIOS Name Service Queries are defined in "RFC 1001: Protocol Standard for a NetBIOS Service on a TCP/UDP Transport: Concepts and Methods," Network Working Group, March, 1987, available at http://www.obiqx.org/cifs/rfc-draft/rfc1001.html, and further described at http://www.obiqx.org/cifs/NetBIOS.html.

Broadcast ping requests ask all nodes to respond with their MAC and IP addresses. Ping requests, also called ICMP echo requests, are defined in J. Postel, "RFC 792: Internet Control Message Protocol," Network Working Group, 1981, available at http://www.faqs.org/rfcs/rfc792.html.

In step 503, the facility branches on the type of traffic received via the network. If the received packet is a DHCP reply packet, then the facility continues at step 504. In step 504, the facility adopts for the unconfigured device the IP address assigned to the unconfigured device in the received reply. In step 505, the facility uses the device IP address and gateway MAC address contained in the reply to contact a server on the list of server IP addresses. The server IP addresses are preferably stored in nonvolatile memory in the device. After step 505, the steps conclude.

If the traffic received in step 503 is an ARP request or an ARP reply, the facility continues in step 506. In step 506, the facility adds a destination IP address of the received packet to a list of monitored IP addresses, and adds the destination MAC address of the packet to a list of monitored MAC addresses. After step 506, the facility continues in step 507.

If the traffic received in step 503 is a Cisco Discovery Protocol Packet, a NetBIOS Name Service packet, or a ping reply packet, then the facility continues in step 507. Cisco Discovery Protocol Packets typically sent periodically by any Cisco devices. This protocol is described at http://www.ccci.com/welcher/papers/cdp.html.

In step 507, the facility adds the source IP address of the received packet to the list of monitored IP addresses and adds the source MAC address of the packet to the list of monitored MAC addressees. In step 508, if the monitoring period has been exceeded then the facility continues through connector A in step 509, else the facility continues in step 503 to receive additional traffic during the monitoring period.

In step 509, the facility uses the list of monitored IP addresses to identify an IP address likely to be both within the range of IP addresses assigned to the local area network, and unused. For example, the facility may identify an IP address that is between two IP addresses in the list of monitored IP addresses. In step 510, the facility sends an ARP request for the identified IP address in order to determine whether any nodes in the network are using the identified IP address. In step 511, if a response to the ARP requests and in step 510 is received within a maximum response interval, then the facility continues in step 509 to identify another IP address, else the facility continues in step 512 to adopt the IP address identified in step 509 for the device.

In steps 513–520 the facility loops through each MAC address in the list of monitored MAC addresses. In steps 514–519, the facility loops through each server IP address in the list of server IP addresses. In step 515, the facility forms and sends a packet, such as an UDP packet, to the current server IP address via the current MAC address. After step 515, the facility continues in step via connector B in step 516. In step 516, the facility branches on the type of response received to the UDP packets sent in step 515. If a reply from the server, i.e., the configured node, is received, the facility continues in step 517. In step 517, the facility contacts the server using the IP address adopted in step 512 via the current MAC address. After step 517, these steps conclude.

If the response received in step 516 is an ICMP redirect, then the facility continues in step 518. In step 518, the facility replaces the destination map address of the packet formed in step 515 and resends this packet. After step 518, the facility continues in step 516 to received a new response to the recent packet.

If no response to the packet sent on Step 515 is received within a maximum response interval, then the facility continues in step 519. In step 519, if additional MAC addresses remain in a list of MAC addresses, the facility continues in step 514 to process the next MAC address. Otherwise the facility continues in step 520.

In step 520, if additional server IP addresses remain in a list of server IP addressees. The facility continues in step 513 to process the next server IP address. Otherwise, the facility continues through connector C in step 502 to repeat the monitoring processes. It will be appreciated by those skilled in the art the process described above may be modified in a variety of ways, including immediately following and sending all the UDP packets before monitoring for any replies. Also, different arrangements of stimulus packets may be used.

It will be understood by those skilled in the art that the above-described facility could be adapted or extended in various ways. For example, the facility may be used to establish contact between various kinds of devices for various purposes. Further, a variety of different IP datagrams may be used by the contacting node to stimulate an ARP request in the local area network, and ultimately contact the contacted node. Additionally, the facility may utilize protocols and types of networks other than those discussed herein. While the foregoing description makes reference to preferred embodiments, the scope of the invention is defined solely by the claims that follow and the elements recited therein.

What is claimed is:

1. A method in a first node within a first network for establishing contact with a second node outside the first network, the first node having a physical address, comprising:

detecting an address resolution request broadcast within the first network, the address resolution request containing a logical target address;

determining whether an address resolution response to the detected address resolution request is transmitted from a node in the first network other than the first node;

if it is determined that no address resolution response to the detected address resolution request is transmitted from a node in the first network other than the first node;

transmitting an address resolution response to the detected address resolution request containing the physical address of the first node; and adopting the logical target address contained by the detected address resolution request as the logical address of the first node, wherein it is determined that no address resolution response to the detected address resolution request is transmitted from a node in the first network other than the first node if at least a threshold period of time elapses after the address resolution request is detected without a response to the detected address resolution request being detected.

2. A method in a first node within a first network for establishing contact with a second node outside the first network, the first node having a physical address, comprising:

detecting an address resolution request broadcast within the first network, the address resolution request containing a logical target address;

determining whether an address resolution response to the detected address resolution request is transmitted from a node in the first network other than the first node;

if it is determined that no address resolution response to the detected address resolution request is transmitted from a node in the first network other than the first node;

transmitting an address resolution response to the detected address resolution request containing the physical address of the first node; and adopting the logical target address contained by the detected address resolution request as the logical address of the first node, wherein it is determined that no address resolution response to the detected address resolution request is transmitted from a node in the first network other than the first node if the detected address resolution request is rebroadcast at least a threshold number of times without a response to the detected address resolution request being detected.

3. A method in a first node within a first network for establishing contact with a second node outside the first network, the first node having a physical address, comprising:

detecting an address resolution request broadcast within the first network, the address resolution request containing a logical target address;

in response to detecting an address resolution request broadcast within the first network, causing to be broadcast in the first network a second address resolution request, the second address resolution request containing as its physical source address the physical address of the first node, the second address resolution request containing as its logical target address the logical target address contained in the address resolution request;

determining whether an address resolution response to the detected address resolution request is transmitted from a node in the first network other than the first node;

if it is determined that no address resolution response to the detected address resolution request is transmitted from a node in the first network other than the first node:

transmitting an address resolution response to the detected address resolution request containing the physical address of the first node; and adopting the logical target address contained by the detected address resolution request as the logical address of the first node, wherein it is determined that no address resolution response to the detected address resolution request is transmitted from a node in the first network other than the first node if at least a threshold period of time elapses after the second address resolution request is broadcast without a response to the second address resolution request being detected.

4. A method in a first node within a first network for establishing contact with a second node outside the first network, the first node having a physical address, comprising:

detecting an address resolution request broadcast within the first network, the address resolution request containing a logical target address;

determining whether an address resolution response to the detected address resolution request is transmitted from a node in the first network other than the first node;

if it is determined that no address resolution response to the detected address resolution request is transmitted from a node in the first network other than the first node:

transmitting an address resolution response to the detected address resolution request containing the physical address of the first node;

adopting the logical target address contained by the detected address resolution request as the logical address of the first node, and sending a gratuitous address resolution protocol request identifying the first node as the owner of the logical target address contained in the detected address resolution request.

5. A method in a first node within a first network for establishing contact with a second node outside the first network, the first node having a physical address, comprising:

detecting an address resolution request broadcast within the first network, the address resolution request containing a logical target address;

determining whether an address resolution response to the detected address resolution request is transmitted from a node in the first network other than the first node;

if it is determined that no address resolution response to the detected address resolution request is transmitted from a node in the first network other than the first node:

transmitting an address resolution response to the detected address resolution request containing the physical address of the first node; and adopting the logical target address contained by the detected address resolution request as the logical address of the first node;

receiving a message containing as its physical target address the physical address of the first node and containing as its logical target address the logical target address contained in the detected address resolution request; and in response to receiving the message, sending a gratuitous address resolution protocol request identifying the first node as the owner of the logical target address contained in the detected address resolution request.

6. A method in a first node within a first network for establishing contact with a second node outside the first network, comprising:

identifying a first message broadcast within the first network for which no reply is transmitted, the first message including a source address associated with the second node, the first message contains a target address;

in response to identifying the first message:

sending a second message to the second node adopting the target address contained by the first message as the address of the first node;

including the target address contained by the first message in the second message as the source address of the second message; and receiving messages having as their target addresses the target address contained by the first message.

7. A method in a first computing device, comprising:

determining that the first computing device has been connected to a distinguished computer network, the distinguished computer network being a first-level computer network that is connected to a second-level computer network;

utilizing the distinguished computer network and the second-level computer network to establish contact with a second computing device that is outside the distinguished computer network by use of a message addressed to an unused address reserved for use in the distinguished computer network;

detecting a message sent by the second computing device from an address of the second computing device to an unused address reserved for use by the distinguished computer network;

adopting the unused address for use by the first computing device; and responding to the detected message with a message addressed to the address of the second computing device from the adopted address.

8. A method in a first computing device, comprising:

determining that the first computing device has been connected to a distinguished computer network, the distinguished computer network being a first-level computer network that is connected to a second-level computer network;

utilizing the distinguished computer network and the second-level computer network to establish contact with a second computing device that is outside the distinguished computer network by use of a message addressed to an unused address reserved for use in the distinguished computer network;

monitoring traffic in the distinguished network to identify one or more candidate addresses for a gateway between the distinguished network and one or more other networks; and sending a message to a predetermined address for the second computing device via each of the identified gateway candidate addresses.

9. The method of claim 8, further comprising sending one or more stimuli messages to elicit traffic in the distinguished network for monitoring.

* * * * *